(12) United States Patent
Ding et al.

(10) Patent No.: US 9,219,370 B2
(45) Date of Patent: Dec. 22, 2015

(54) METHOD AND SYSTEM OF PERFORMING CHARGING PROCESSING FOR MOBILE DEVICE, AND MOBILE DEVICE OPERATING THE METHOD AND SYSTEM

(71) Applicant: TENCENT TECHNOLOGY (SHENZHEN) COMPANY LIMITED, Shenzhen (CN)

(72) Inventors: Haifeng Ding, Shenzhen (CN); Sensheng Xu, Shenzhen (CN); Lei Long, Shenzhen (CN); Wenliang Tang, Shenzhen (CN); Cancai Yuan, Shenzhen (CN); Rulan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/415,245

(22) PCT Filed: Jul. 12, 2013

(86) PCT No.: PCT/CN2013/079298
§ 371 (c)(1),
(2) Date: Jan. 16, 2015

(87) PCT Pub. No.: WO2014/012463
PCT Pub. Date: Jan. 23, 2014

(65) Prior Publication Data
US 2015/0171651 A1  Jun. 18, 2015

(30) Foreign Application Priority Data

Jul. 20, 2012  (CN) .......................... 2012 1 0252191

(51) Int. Cl.
*H01M 10/44* (2006.01)
*H02J 7/00* (2006.01)
*H04M 1/725* (2006.01)

(52) U.S. Cl.
CPC ............... *H02J 7/0047* (2013.01); *H02J 7/007* (2013.01); *H02J 7/0052* (2013.01); *H04M 1/72519* (2013.01); *H02J 2007/005* (2013.01); *H02J 2007/0096* (2013.01)

(58) Field of Classification Search
CPC ....... H02J 7/0047; H02J 7/0052; H02J 7/007; H02J 2007/005; H02J 2007/0096
USPC ........................................................ 320/107
See application file for complete search history.

(56) References Cited

U.S. PATENT DOCUMENTS

| | | | |
|---|---|---|---|
| 5,723,971 A | | 3/1998 | Sakai et al. |
| 6,107,779 A | * | 8/2000 | Hara et al. ..................... 320/132 |

(Continued)

FOREIGN PATENT DOCUMENTS

| | | |
|---|---|---|
| CN | 1503428 A | 6/2004 |
| CN | 1777311 A | 5/2006 |

(Continued)

OTHER PUBLICATIONS

Office Action in CN Application No. 201210252191.1 dated Feb. 19, 2014.

(Continued)

*Primary Examiner* — Drew A Dunn
*Assistant Examiner* — Jerry D Robbins
(74) *Attorney, Agent, or Firm* — Marshall, Gerstein & Borun LLP

(57) ABSTRACT

A method and system of performing charging processing for a mobile device is disclosed. The method includes: obtaining a non-linear equation related to a charging time variable and a charge percentage variable, and obtaining a current charge percentage; calculating remaining charging time according to the current charge percentage and the non-linear equation; and displaying the remaining charging time. By the solution of the present invention, the remaining charging time of the mobile device can be displayed accurately.

12 Claims, 2 Drawing Sheets

(56) References Cited

U.S. PATENT DOCUMENTS

| | | | |
|---|---|---|---|
| 6,366,054 B1* | 4/2002 | Hoenig et al. | 320/132 |
| 6,677,729 B2* | 1/2004 | Arai | 320/132 |
| 2001/0034541 A1 | 10/2001 | Lyden | |
| 2004/0135548 A1 | 7/2004 | Takano et al. | |
| 2005/0027465 A1 | 2/2005 | Pozsgay et al. | |
| 2006/0145658 A1* | 7/2006 | Wang | 320/107 |
| 2009/0027056 A1* | 1/2009 | Huang et al. | 324/439 |
| 2009/0132974 A1* | 5/2009 | Yoshimoto et al. | 716/4 |
| 2012/0025766 A1* | 2/2012 | Reade et al. | 320/110 |
| 2012/0043927 A1* | 2/2012 | Park et al. | 320/107 |
| 2012/0126744 A1* | 5/2012 | Kuroda et al. | 320/107 |
| 2014/0008976 A1* | 1/2014 | Yebka et al. | 307/23 |

FOREIGN PATENT DOCUMENTS

| | | |
|---|---|---|
| CN | 101436690 A | 5/2009 |
| CN | 201839021 U | 5/2011 |
| CN | 102231548 A | 11/2011 |
| CN | 102738871 A | 10/2012 |
| JP | 9-322420 | 12/1997 |
| JP | 11089105 | 3/1999 |
| JP | 2008011588 A | 1/2008 |

OTHER PUBLICATIONS

International Preliminary Report on Patentability in International Application No. PCT/CN2013/079298 dated Jan. 29, 2015.
International Search Report and Written Opinion in Application No. PCT/CN2013/079298 dated Oct. 10, 2013.
Search Report from European Application No. 13820149.6 dated Jul. 10, 2015.

* cited by examiner

US 9,219,370 B2

METHOD AND SYSTEM OF PERFORMING CHARGING PROCESSING FOR MOBILE DEVICE, AND MOBILE DEVICE OPERATING THE METHOD AND SYSTEM

CROSS-REFERENCE TO RELATED APPLICATIONS

This application is a U.S. national phase application under 35 U.S.C. §371 of International Application No. PCT/CN2013/079298 filed Jul. 12, 2013, entitled "Method and System of Performing Charging Processing for Mobile Device, and Mobile Device Operating the Method and System," which claims the priority of Chinese Patent Application No. 201210252191.1 filed Jul. 20, 2012, the entire respective disclosures of which are incorporated herein by reference.

TECHNICAL FIELD

The present invention relates to charging technologies, and more particular to a method and system of performing charging processing for a mobile device, and the mobile device operating the method and the system.

BACKGROUND

A conventional method of performing charging processing for a mobile device includes: during a procedure of charging the mobile device, a charging indication is displayed on the screen of the mobile device, and the mobile device obtains a current charge percentage and displays the current charge percentage on the screen. Specifically, the current charge percentage may be indicated by the proportion of shadow in a rectangle box. This method only can indicate the current charge percentage approximately. The larger the proportion of shadow in the rectangle box is, the larger the current charge percentage is.

In practical applications, it is usually needed to obtain current remaining charging time of the mobile device, but this technology has not been provided at present.

SUMMARY OF THE INVENTION

An example of the present invention provides a method of performing charging processing for a mobile device, by which current remaining charging time of the mobile device can be displayed accurately.

An example of the present invention provides a system of performing charging processing for a mobile device, by which current remaining charging time of the mobile device can be displayed accurately.

An example of the present invention provides a mobile device, which can display current remaining charging time accurately.

A method of performing charging processing for a mobile device includes:
 obtaining a non-linear equation related to a charging time variable and a charge percentage variable, and obtaining a current charge percentage;
 calculating remaining charging time according to the current charge percentage and the non-linear equation; and
 displaying the remaining charging time.

A system of performing charging processing for a mobile device includes an equation generating device and the mobile device, where
 the equation generating device is configured to collect history charging data including a charge percentage and charging time corresponding to the charge percentage, and generating a non-linear equation related to a charge percentage variable and a charging time variable through fitting the history charging data; and
 the mobile device is configured to obtain the non-linear equation from the equation generating device, and obtain a current charge percentage; calculate remaining charging time according to the current charge percentage and the non-linear equation, and display the remaining charging time.

A mobile device includes an equation obtaining unit, a charge percentage obtaining unit, a calculating unit and a charge displaying unit, where
 the equation obtaining unit is configured to obtain a non-linear equation related to a charge percentage variable and a charging time variable, and send the non-linear equation to the calculating unit;
 the charge percentage obtaining unit is configured to obtain a current charge percentage and send the current charge percentage to the calculating unit;
 the calculating unit is configured to calculate remaining charging time according to the current charge percentage and the non-linear equation, and send the remaining charging time to the charge displaying unit; and
 the charge displaying unit is configured to display the remaining charging time.

Depending upon embodiment, one or more benefits may be achieved. These benefits and various additional objects, features and advantages of the present invention can be fully appreciated with reference to the detailed description and accompanying drawings that follow. For example, according to the methods, devices and systems described in embodiments of the present invention, the non-linear equation related to the charging time variable and the charge percentage variable is obtained, the remaining charging time is calculated according to the current charge percentage and the non-linear equation, and the remaining charging time is displayed. In this way, the current remaining charging time of the mobile device can be displayed accurately.

DETAILED DESCRIPTION

In order to make the object, technical solution and merits of the present invention clearer, the present invention will be illustrated in detail hereinafter with reference to the accompanying drawings and specific examples.

In embodiments of the present invention, current remaining charging time of a mobile device is obtained and displayed according to a non-linear equation. Examples of mobile devices that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Figure 1:
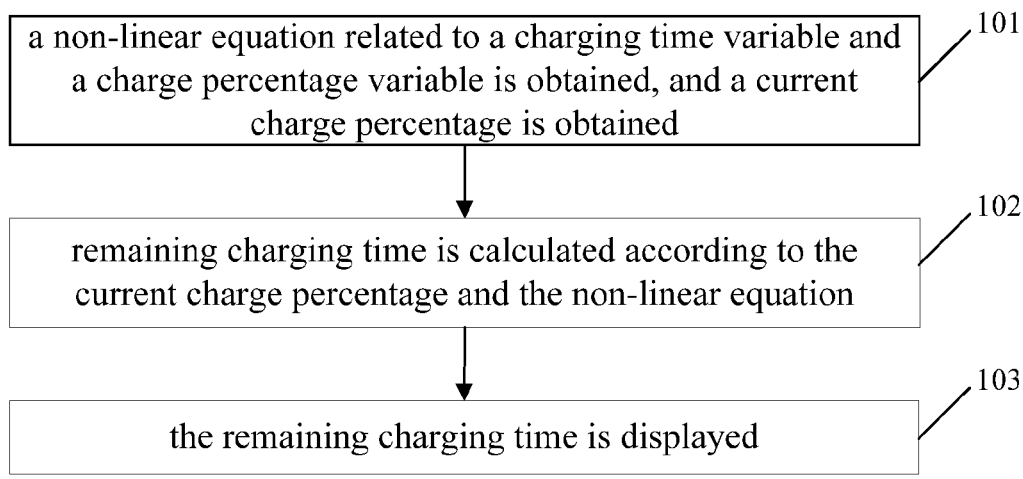
FIG. 1 is a schematic diagram illustrating a method of performing charging processing for a mobile device according to an example of the present invention.

FIG. 1 is a schematic diagram illustrating a method of performing charging processing for a mobile device according to an example of the present invention. Referring to FIG. 1, the method includes following processes.

In process 101, a non-linear equation related to a charging time variable and a charge percentage variable is obtained, and a current charge percentage is obtained.

In various embodiments, during a procedure of charging the mobile device, the mobile device obtains the current charge percentage.

For the mobile device, the charge percentage and charging time are non-linear during the procedure of charging the mobile device. In the example of the present invention, the non-linear equation applicable to general cases is obtained through collecting a mass of charging data.

The non-linear equation may be generated by a network side device, and the mobile device may obtain the non-linear equation from the network side device as required. A method of generating the non-linear equation includes:

collecting history charging data including the charge percentage and charging time corresponding to the charge percentage, and generating the non-linear equation related to the charge percentage variable and the charging time variable through fitting the history charging data.

A method of collecting the history charging data includes: collecting the charge percentage $P_i$, and taking charging time of charging the mobile device from $P_i$ to $P_i+B$ as charging time $T_i$ corresponding to the charge percentage $P_i$, where B is a predefined charge increment value, for example, 1%, and i is a natural number. After the charging data $(P_i, T_i)$ is collected, the non-linear equation $F(P)=T$ is generated by fitting the charging data according to an interpolation algorithm such as a Lagrange interpolation algorithm or a Newton interpolation algorithm.

In process 102, remaining charging time is calculated according to the current charge percentage and the non-linear equation.

In various embodiments, the current charge percentage is indicated as P1, and the charging time of charging the mobile device from $P_i$ to $P_i+B$ is indicated as T'.

The remaining charging time may be calculated according to $P_1$ and $F(P)=T$.

Specifically, $P_1+kB$ is substituted into the non-linear equation $F(P)=T$ to obtain $T_k$, where k is an integer among 0 to M and $P_1+MB$ is smaller than or equal to 100%, the sum of $T_k$, $$S = \sum_{k=0}^{M} T_K,$$

is calculated, and S is taken as the remaining charging time.

Charging conditions in practical charging procedures may be different. In order to make the remaining charging time more accurate, the remaining charging time is adjusted in an example of the present invention. Specifically, a method of adjusting the remaining charging time includes:

substituting $P_1+kB$ into the non-linear equation $F(P)=T$ to obtain $T_k$, where k is an integer among 0 to M and $P_1+MB$ is smaller than or equal to 100%, calculating the sum of $T_k$, $$S = \sum_{k=0}^{M} T_K,$$

taking $T'/T_1$ as an adjustment parameter, and taking a product of multiplying S by $T'/T_1$ as the remaining charging time.

In process 103, the remaining charging time is displayed.

In various embodiments, the remaining charging time may be displayed on the screen of the mobile device.

In order to display a current charging state, after the current charge percentage is obtained in process 101 shown in FIG. 1, the method further includes: determining the charging state according to the current charge percentage, and displaying the charging state on the screen of the mobile device. The charging state includes a fast charging state, a continuous charging state and a trickle charging state. A range of the charge percentage in the fast charging state is 0%~80%, a range of the charge percentage in the continuous charging state is 80%~100%, and a range of the charge percentage in the trickle charging state is 100% and the mobile device continues to be charged for a period of time after the charge percentage reaches 100%.

After the charging procedure ends, if a charging cable is still connected to a power supply, the battery will be overcharged. Overcharging will influence the life of the battery. Accordingly, in an example of the present invention, an alarm clock prompt is triggered after the charging procedure ends. Specifically, after the current charge percentage is obtained in process 101, the method further includes: determining whether the current charge percentage is equal to 100%. If the current charge percentage is equal to 100%, the alarm clock prompt is triggered.

The solution provided by the example of the present invention may be implemented by a charging client running in an operation system of the mobile device. After the mobile device boots, the operation system sends a boot command to the charging client, and after receiving the boot command, the charging client determines whether the non-linear equation has been saved; if no, process 101 is performed, and if yes, it is indicated that the non-linear equation has been obtained. Correspondingly, obtaining the current charge percentage in process 101 includes: calling a system information interface, and obtaining the current charge percentage from the operation system. The operation system provides an open system information interface for processes running in the operation system. Each process may obtain system information through calling the system information interface. The system information includes the current charge percentage.

The operation system not only provides the open system information interface but also provides an open system drawing interface. The displaying the remaining charging time in process 103 shown in FIG. 1 includes: the charging client calls the system drawing interface, selects a format interface, input the remaining charging time in the format interface, generates a displaying interface, and displays the displaying interface on the screen of the mobile device. The system drawing interface is used for drawing the displaying interface. Through calling the system drawing interface, the charging client may select the format interface from multiple format interfaces provided by the operation system, and inputs different information in different regions of the format interface according to the prompt of the format interface. For example, the remaining charging client is inputted.

In order to enrich the display of the format interface, in an example of the present invention, multiple displaying interfaces may be generated and saved, and then a selected displaying interface is displayed as required by the user. Specifically, at least two format interfaces are selected, and information contents are inputted into each format interface to generate a displaying interface. The inputted information contents include the remaining charging time. Other contents may also be inputted into each format interface as required. For example, the current charge percentage is inputted into one format interface, and current time is inputted into the other format interface. A format interface identity corresponding to each displaying interface is generated and each displaying interface is saved. Afterwards, a prompt box for prompting the user to select a format interface is displayed, selecting information including a format interface identity inputted by the user is received, and a displaying interface corresponding to the format interface identity is displayed on the screen of the mobile device.

In the example of the present invention, according to the non-linear equation, the current remaining charging time can be displayed accurately. Moreover, the current charging state of the mobile device can be prompted to the user. An alarm clock prompt is performed when the charging procedure ends. If the charging cable is not pulled out after the charging procedure ends, an overcharging prompt is performed. In this way, more charging information is provided, thereby charging the mobile device effectively.

Figure 2:
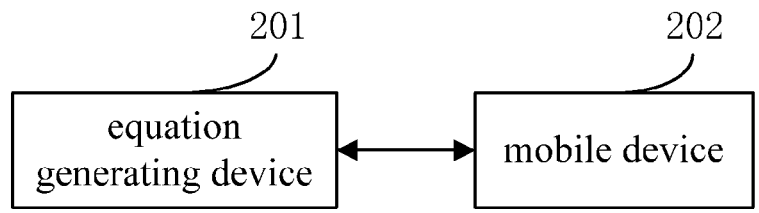
FIG. 2 is a schematic diagram illustrating a system of performing charging processing for a mobile device according to an example of the present invention.

FIG. 2 is a schematic diagram illustrating a system of performing charging processing for a mobile device according to an example of the present invention. Referring FIG. 2, the system includes an equation generating device 201 and a mobile device 202.

The equation generating device 201 is configured to collect history charging data including a charge percentage and charging time corresponding to the charge percentage, and generate a non-linear equation related to a charge percentage variable and a charging time variable through fitting the history charging data.

The mobile device 202 is configured to obtain the non-linear equation from the equation generating device 201, and obtain a current charge percentage; calculate remaining charging time according to the current charge percentage and the non-linear equation, and display the remaining charging time.

Figure 3:
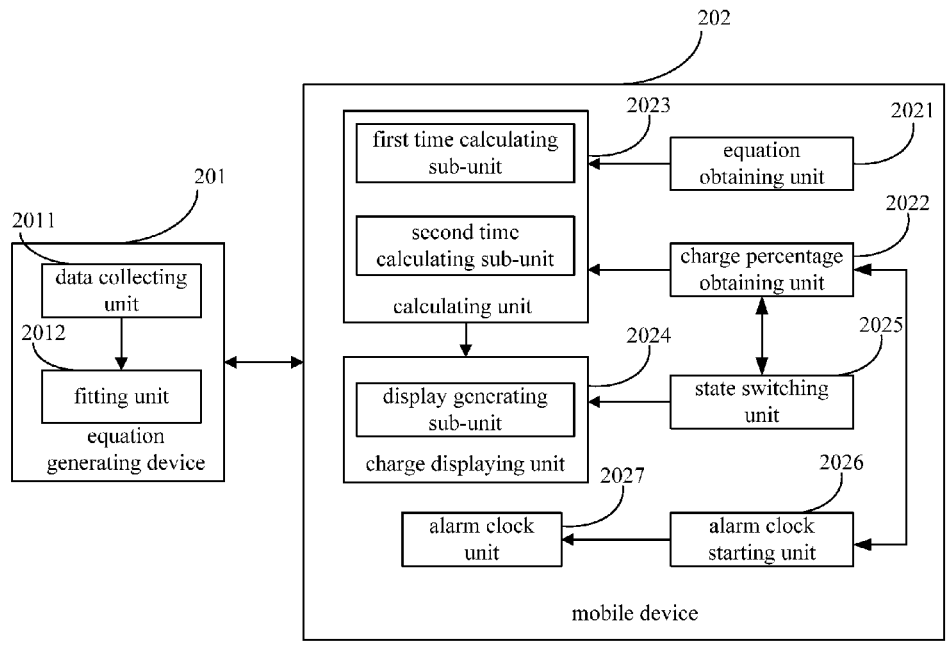
FIG. 3 is a schematic diagram illustrating the structure of an equation generating device and a mobile device shown in FIG. 2.

FIG. 3 is a schematic diagram illustrating the structure of the equation generating device 201 and the mobile device 202 shown in FIG. 2. The mobile device 202 includes an equation obtaining unit 2021, a charge percentage obtaining unit 2022, a calculating unit 2023 and a charge displaying unit 2024.

The equation obtaining unit 2021 is configured to obtain the non-linear equation related to the charge percentage variable and the charging time variable from the equation generating device 201, and send the non-linear equation to the calculating unit 2023.

The charge percentage obtaining unit 2022 is configured to obtain the current charge percentage and send the current charge percentage to the calculating unit 2023.

The calculating unit 2023 is configured to calculate the remaining charging time according to the current charge percentage and the non-linear equation, and send the remaining charging time to the charge displaying unit 2024.

The charge displaying unit 2024 is configured to display the remaining charging time.

In an example of the present invention, the equation generating device 201 includes a data collecting unit 2011 and a fitting unit 2012, and the calculating unit 2023 in the mobile device 202 including a first time calculating sub-unit.

The data collecting unit 2011 is configured to collect the charge percentage $P_i$, and take charging time of charging the mobile device 202 from $P_i$ to $P_i+B$ as charging time $T_i$ corresponding to the charge percentage $P_i$, where B is a predefined charge increment value and i is a natural number.

The fitting unit 2012 is configured to generate the non-linear equation $F(P)=T$ related to the charge percentage variable and the charging time variable through fitting the charging data.

The first time calculating sub-unit is configured to substitute $P_1+kB$ into the non-linear equation $F(P)=T$ to obtain $T_k$, where $P_1$ is the current charge percentage, k is an integer among 0 to M and $P_1+MB$ is smaller than or equal to 100%, calculate the sum of $T_k$, $$S = \sum_{k=0}^{M} T_K,$$

take S as the remaining charging time.

In another example of the present invention, the equation generating device 201 includes a data collecting unit 2011 and a fitting unit 2012, and the calculating unit 2023 in the mobile device 202 includes a second time calculating sub-unit.

The data collecting unit 2011 is configured to collect the charge percentage $P_h$, and take charging time of charging the mobile device 202 from $P_i$ to $P_i+B$ as charging time $T_i$ corresponding to the charge percentage Pi, where B is a predefined charge increment value and i is a natural number.

The fitting unit 2012 is configured to generate the non-linear equation $F(P)=T$ related to the charge percentage variable and the charging time variable through fitting the charging data.

The second time calculating sub-unit is configured to indicate charging time of charging the mobile device 202 from $P_1$ to $P_1+B$ as T', substitute $P_1+kB$ into the non-linear equation $F(P)=T$ to obtain $T_k$, where k is an integer among 0 to M and $P_1+MB$ is smaller than or equal to 100%, calculate the sum of $T_k$, $$S = \sum_{k=0}^{M} T_K,$$

take $T'/T_1$ as an adjacent parameter, and take a product of multiplying S by $T'/T_1$ as the remaining charging time.

In an example of the present invention, the mobile device 202 further includes a state switching unit 2025, configured to obtain the current charge percentage from the charge percentage obtaining unit 2022, determine a charging state according to the current charge percentage, and send the charging state to the charge displaying unit 2024. The charging state includes a fast charging state, a continuous charging state and a trickle charging state.

The charge displaying unit 2024 is configured to display the charging state on the screen of the mobile device 202.

In an example of the present invention, the mobile device 202 further includes an alarm clock starting unit and an alarm clock unit.

The alarm clock starting unit 2026 is configured to obtain the current charge percentage from the charge percentage obtaining unit 2022, determine whether the current charge percentage is equal to 100%, and if yes, send a starting command to the alarm clock unit 2027.

The alarm clock unit 2027 is configured to perform an alarm clock prompt after receiving the starting command.

In an example of the present invention, the charge displaying unit 2024 includes a display generating sub-unit, configured to call a system drawing interface, obtain a format interface, input the remaining charging time in the format interface, generate a displaying interface and display the displaying interface on the screen of the mobile device 202.

Figure 4:
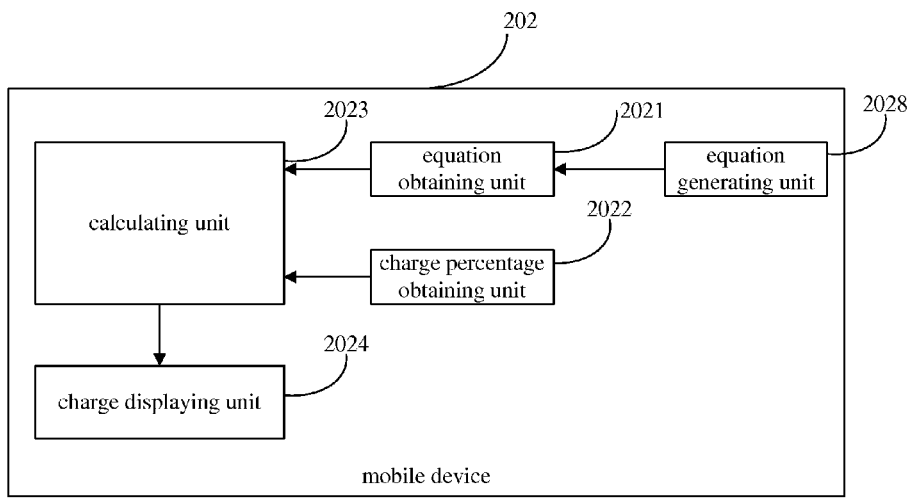
FIG. 4 is a schematic diagram illustrating the certain components of the mobile device according to another example of the present invention.

FIG. 4 is a schematic diagram illustrating the certain components of the mobile device 202 according to another example of the present invention. Referring FIG. 4, the mobile device 202 includes an equation generating unit 2028, an equation obtaining unit 2021, a charge percentage obtaining unit 2022, a calculating unit 2023 and a charge displaying unit 2024.

The equation generating unit 2028 is configured to collect history charging data including a charge percentage and charging time corresponding to the charge percentage, generate a non-linear equation related to a charge percentage variable and a charging time variable through fitting the history charging data, and send the non-linear equation to the equation generating unit 2028.

The charge percentage obtaining unit 2022 is configured to obtain the current charge percentage from the equation generating unit 2028 and send the current charge percentage to the calculating unit 2023.

The calculating unit 2023 is configured to calculate the remaining charging time according to the current charge percentage and the non-linear equation, and send the remaining charging time to the charge displaying unit 2024.

The charge displaying unit 2024 is configured to display the remaining charging time.

As can be seen, the functions of the equation generating device 201 are implemented as an internal unit of the mobile device 202, and the implementation method of the functions is the same as that described in the above and is not illustrated herein. The functions of other units of the mobile device 202 are similar to those described in the above and is not illustrated herein.

The units of the mobile device shown in FIGS. 3 and 4 are divided based on logic functions, and in practical applications, the functions of one unit may be implemented by multiple units, and the functions of multiple units may be implemented by one unit. In another example of the present invention, the mobile device may further include a CPU and storage. The units of the mobile device are connected to the CPU and storage through an internal bus. The functions of the units are initiated and controlled by respective unit, and in practical applications, the functions may be implemented by the assistance of other units and may be implemented by multiple unit corporately. For example, the processing functions of the CPU may be used, information in the storage may be read and data transmission may be implemented through the internal bus.

The functions of the system described in the example of the present invention may be implemented by one or any combination of hardware, software and firmware. If the system is implemented by the software, the functions may be saved in a computer-readable medium, or may be transmitted in the computer-readable medium in a form of one or more commands or codes. The computer-readable medium includes a computer storage medium and a communication medium facilitating to transfer computer programs from one place to another place. The storage medium may be a usable medium that can be accessed by any general or special computer. For example, such computer-readable medium includes, but is not limited to, RAM, ROM, EEPROM, CD-ROM, a CD storage apparatus, a disk storage apparatus, other magnetism storage apparatuses, or a medium for bearing or saving commands or data structures and program codes that can be read by a general or special computer or a general or special processor. In addition, any link may be defined as the computer-readable medium. The disk and disc include a compression disc, a laser disc, a CD, a DVD, a floppy disk and a blu-ray disc. The disc copies data by its magnetism and the disk optically copy data by laser. And the above combination may be included in the computer-readable medium.

The foregoing is only embodiments of the present invention and is not used to limit the protection scope of the present invention. Any modification, equivalent substitution and improvement without departing from the spirit and principle of the present invention are within the protection scope of the present invention.

What is claimed is:

1. A method of performing charging processing for a mobile device, comprising:
obtaining a non-linear equation related to a charging time variable and a charge percentage variable, and obtaining a current charge percentage;
calculating remaining charging time according to the current charge percentage and the non-linear equation; and
displaying the remaining charging time;
the method further comprises: generating the non-linear equation, wherein
the generating the non-linear equation comprises:
collecting history charging data including a charge percentage and charging time corresponding to the charge percentage, and generating the non-linear equation related to the charge percentage variable and the charging time variable through fitting the history charging data; wherein
the collecting the history charging data comprises:
collecting the charge percentage $P_i$, and taking charging time of charging the mobile device from $P_i$ to $P_i+B$ as charging time $T_i$ corresponding to the charge percentage $P_i$, wherein B is a predefined charge increment value and i is a natural number; and
the current charge percentage is $P_1$, the non-linear equation is $F(P)=T$, charging time of charging the mobile device from $P_1$ to $P_1+B$ is T', and the calculating the remaining charging time according to the current charge percentage and the non-linear equation comprises: substituting $P_1+kB$ into the non-linear equation $F(P)=T$ to obtain $T_k$, where k is an integer among 0 to M and $P_1+MB$ is smaller than or equal to 100%, calculating the sum of $T_k$, $$S = \sum_{k=0}^{M} T_K,$$

taking T'/T$_1$ as an adjacent parameter, and taking a product of multiplying S by T'/T$_1$ as the remaining charging time.

2. The method of claim 1, before obtaining the non-linear equation related to the charging time variable and the charge percentage variable, further comprising:
   receiving a boot command, determining whether the non-linear equation has been saved, and if the non-linear equation has not been saved, performing the step of obtaining the non-linear equation related to the charging time variable and the charge percentage variable; and
   the obtaining the current charge percentage comprises: calling a system information interface, and obtaining the current charge percentage from an operation system.

3. The method of claim 2, wherein the displaying the remaining charging time comprising: calling a system drawing interface, selecting a format interface, input the remaining charging time in the format interface, generating a displaying interface, and displaying the displaying interface on the screen of the mobile device.

4. The method of claim 3, wherein there are at least two selected format interfaces, and after generating the displaying interface, the method further comprises:
   receiving selecting information inputted by a user, wherein the selecting information comprises a format interface identity, and displaying a displaying interface corresponding to the format interface identity on the screen of the mobile device.

5. The method of claim 1, after obtaining the current charge percentage, further comprising: determining a charging state according to the current charge percentage and displaying the charging state on the screen of the mobile device, wherein the charging state includes a fast charging state, a continuous charging state and a trickle charging state.

6. The method of claim 1, after obtaining the current charge percentage, further comprising:
   determining whether the current charge percentage is equal to 100%, if the current charge percentage is equal to 100%, performing an alarm clock prompt.

7. A system of performing charging processing for a mobile device, comprising an equation generating device and the mobile device, wherein
   the equation generating device is configured to collect history charging data comprising a charge percentage and charging time corresponding to the charge percentage, and generating a non-linear equation related to a charge percentage variable and a charging time variable through fitting the history charging data; and
   the mobile device is configured to obtain the non-linear equation from the equation generating device, and obtain a current charge percentage; calculate remaining charging time according to the current charge percentage and the non-linear equation, and display the remaining charging time; wherein
   the mobile device comprises an equation obtaining unit, a charge percentage obtaining unit, a calculating unit and a charge displaying unit, wherein
   the equation obtaining unit is configured to obtain the non-linear equation related to the charge percentage variable and the charging time variable from the equation generating device, and send the non-linear equation to the calculating unit;
   the charge percentage obtaining unit is configured to obtain a current charge percentage and send the current charge percentage to the calculating unit;
   the calculating unit is configured to calculate remaining charging time according to the current charge percentage and the non-linear equation, and send the remaining charging time to the charge displaying unit; and
   the charge displaying unit is configured to display the remaining charging time;
   the equation generating device comprises a data collecting unit and a fitting unit, and the calculating unit comprises a second time calculating sub-unit, wherein
   the data collecting unit is configured to collect the charge percentage P$_i$, and take charging time of charging the mobile device from P$_i$ to P$_i$+B as charging time T$_i$ corresponding to the charge percentage P$_i$, where B is a predefined charge increment value and i is a natural number;
   the fitting unit is configured to generate the non-linear equation F(P)=T related to the charge percentage variable and the charging time variable through fitting the history charging data; and
   the second time calculating sub-unit is configured to take charging time of charging the mobile device from P$_1$ to P$_1$+B as T', substitute P$_1$+kB into the non-linear equation F(P)=T to obtain T$_k$, where k is an integer among 0 to M and P$_1$+MB is smaller than or equal to 100%, calculate the sum of T$_k$, $$S = \sum_{k=0}^{M} T_K,$$

take T'/T$_1$ as an adjacent parameter, take a product of multiplying S by T'/T$_1$ as the remaining charging time.

8. The system of claim 7, wherein the charge displaying unit comprises a display generating sub-unit, configured to call a system drawing interface, select a format interface, input the remaining charging time into the format interface, generate a displaying interface and display the displaying interface on the screen of the mobile device.

9. A mobile device, comprising an equation obtaining unit, a charge percentage obtaining unit, a calculating unit and a charge displaying unit, wherein
   the equation obtaining unit is configured to obtain a non-linear equation related to a charge percentage variable and a charging time variable, and send the non-linear equation to the calculating unit;
   the charge percentage obtaining unit is configured to obtain a current charge percentage and send the current charge percentage to the calculating unit;
   the calculating unit is configured to calculate remaining charging time according to the current charge percentage and the non-linear equation, and send the remaining charging time to the charge displaying unit; and
   the charge displaying unit is configured to display the remaining charging time;
wherein
   the non-linear equation is indicated as F(P)=T$_i$, charging time of charging the mobile device from P$_1$ to P$_1$+B is indicated as T', and the calculating unit comprises a second time calculating sub-unit, configured to substitute P1+kB into the non-linear equation F(P)=T to obtain T$_k$, where k is an integer among 0 to M and P$_1$+MB is smaller than or equal to 100%, calculate the sum of T$_k$, $$S = \sum_{k=0}^{M} T_K,$$

take T'/T$_1$ as an adjacent parameter, and take a product of multiplying S by T'/T$_1$ as the remaining charging time.

10. The mobile device of claim 9, further comprising a state switching unit, configured to obtain the current charge percentage from the charge percentage obtaining unit, determine a charging state according to the current charge percentage, and send the charging state to the charge displaying unit, wherein the charging state includes a fast charging state, a continuous charging state and a trickle charging state; and the charge displaying unit is further configured to display the charging state on the screen of the mobile device.

11. The mobile device of claim 10, further comprising an alarm clock starting unit and an alarm clock unit, wherein the alarm clock starting unit is configured to obtain the current charge percentage from the charge percentage obtaining unit, determine whether the current charge percentage is equal to 100%, and if the current charge percentage is equal to 100%, send a starting command to the alarm clock unit; and the alarm clock unit is configured to perform an alarm clock prompt after receiving the starting command.

12. The mobile device of claim 10, wherein the charge displaying unit comprises a display generating sub-unit, configured to call a system drawing interface, select a format interface, input the remaining charging time into the format interface, generate a displaying interface and display the displaying interface on the screen of the mobile device.

* * * * *